(12) United States Patent
Ueda

(10) Patent No.: US 12,088,903 B2
(45) Date of Patent: Sep. 10, 2024

(54) ELECTRONIC DEVICE

(71) Applicant: CANON KABUSHIKI KAISHA, Tokyo (JP)

(72) Inventor: Yuji Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 18/060,674

(22) Filed: Dec. 1, 2022

(65) Prior Publication Data

US 2023/0179851 A1 Jun. 8, 2023

(30) Foreign Application Priority Data

Dec. 6, 2021 (JP) ................................ 2021-197873

(51) Int. Cl.
| | |
|---|---|
| *H04N 23/55* | (2023.01) |
| *G01K 1/24* | (2006.01) |
| *G02B 7/02* | (2021.01) |
| *G03B 17/14* | (2021.01) |
| *G03B 17/56* | (2021.01) |

(Continued)

(52) U.S. Cl.
CPC ............ *H04N 23/55* (2023.01); *H04N 23/52* (2023.01); *H04N 23/54* (2023.01); *H04N 23/57* (2023.01); *G01K 1/24* (2013.01); *G02B 7/02* (2013.01); *G02B 7/028* (2013.01); *G03B 17/14* (2013.01);

(Continued)

(58) Field of Classification Search
CPC ........ H04N 23/51; H04N 23/52; H04N 23/54; H04N 23/55; H04N 23/57; H04N 23/58; G02B 7/02; G02B 7/022; G02B 7/026; G02B 7/028; G02B 7/04; G03B 17/14; G03B 17/565; G03B 2217/002; G03B 2205/0076; G03B 2205/0084; G01K 1/20; G01K 1/24; G05D 23/08; G05D 23/1854; G05D 23/2754; G12B 1/02; G12B 7/00;
(Continued)

(56) References Cited

U.S. PATENT DOCUMENTS 9,794,460 B1 * 10/2017 Kim ..................... H04N 23/54
2017/0363834 A1 * 12/2017 Kitamura ............... G02B 7/023
(Continued)

FOREIGN PATENT DOCUMENTS

JP        3173927 B2 *  6/2001 ............. H04N 1/028
JP        2019-207367 A   12/2019

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

A first supporting member supports a third supporting member of an image sensor unit that includes an image sensor supported by a second supporting member, and an adjusting member is provided between the image sensor unit and the first supporting member, and adjusts an imaging surface of the image sensor and a reference plane of the first supporting member so as to be parallel to each other at a first distance. A shaft portion of the image sensor unit fits into a hole provided in the second supporting member so as to be slidable in a direction perpendicular to the imaging surface and supports the second supporting member with respect to the third supporting member. A thermally deformable member is provided between the shaft portion and the hole and deforms to suppress a change in the first distance due to a change in temperature.

27 Claims, 13 Drawing Sheets

(51) Int. Cl.
*H04N 23/52* (2023.01)
*H04N 23/54* (2023.01)
*H04N 23/57* (2023.01)

(52) U.S. Cl.
CPC ...... *G03B 17/565* (2013.01); *G03B 2217/002* (2013.01)

(58) Field of Classification Search
CPC .. G12B 15/06; F28F 2255/04; F28F 2013/008
See application file for complete search history.

(56) References Cited

U.S. PATENT DOCUMENTS

2018/0171991 A1* 6/2018 Miller .................. F16M 11/125
2021/0146834 A1* 5/2021 Lu ........................... H04N 23/55
2021/0223563 A1* 7/2021 Miller ....................... G03B 5/00

* cited by examiner

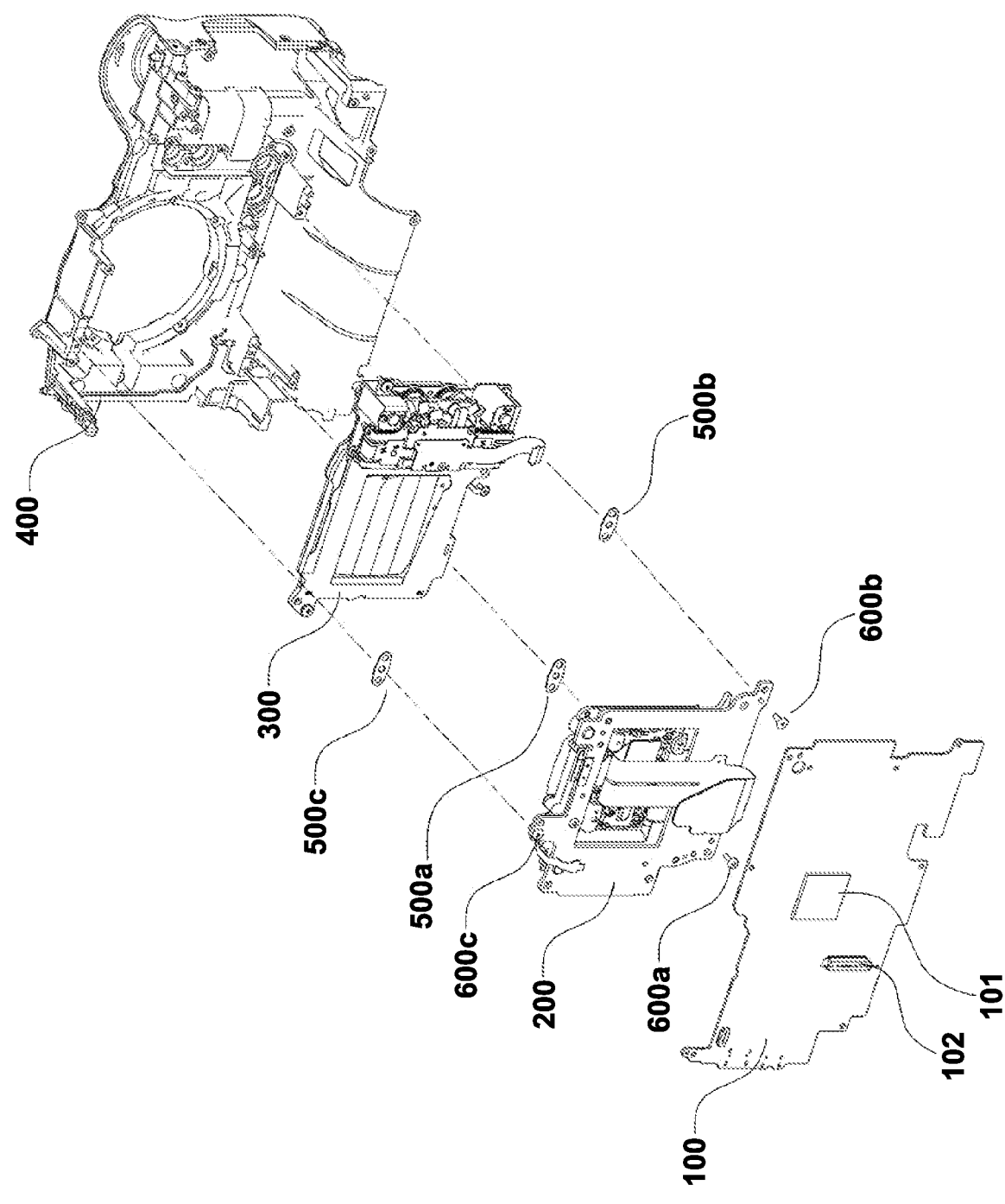

F I G. 6A
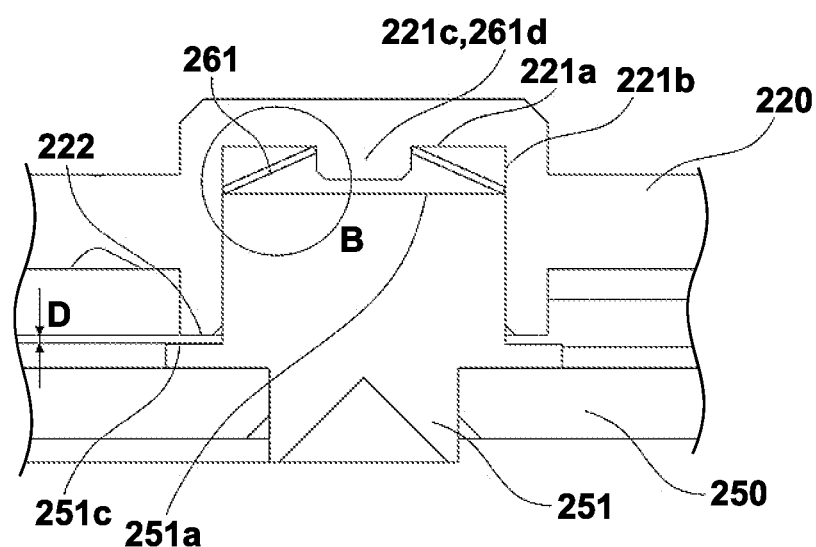
F I G. 6B
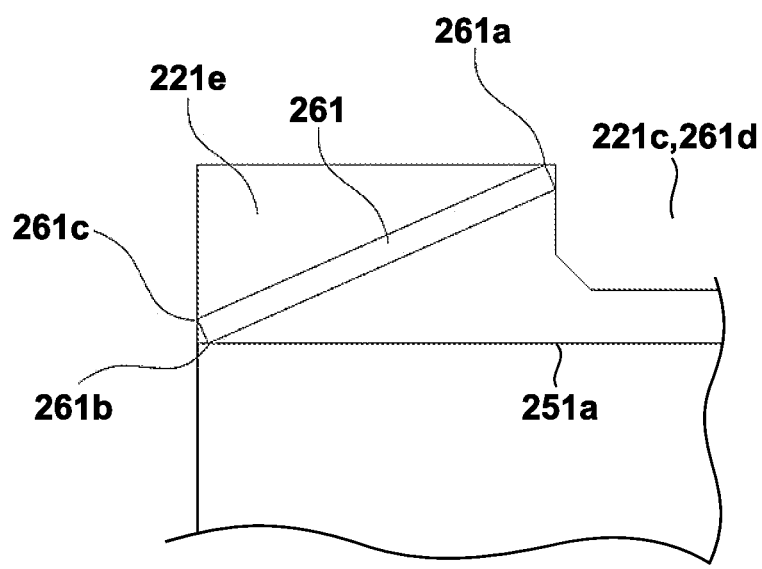

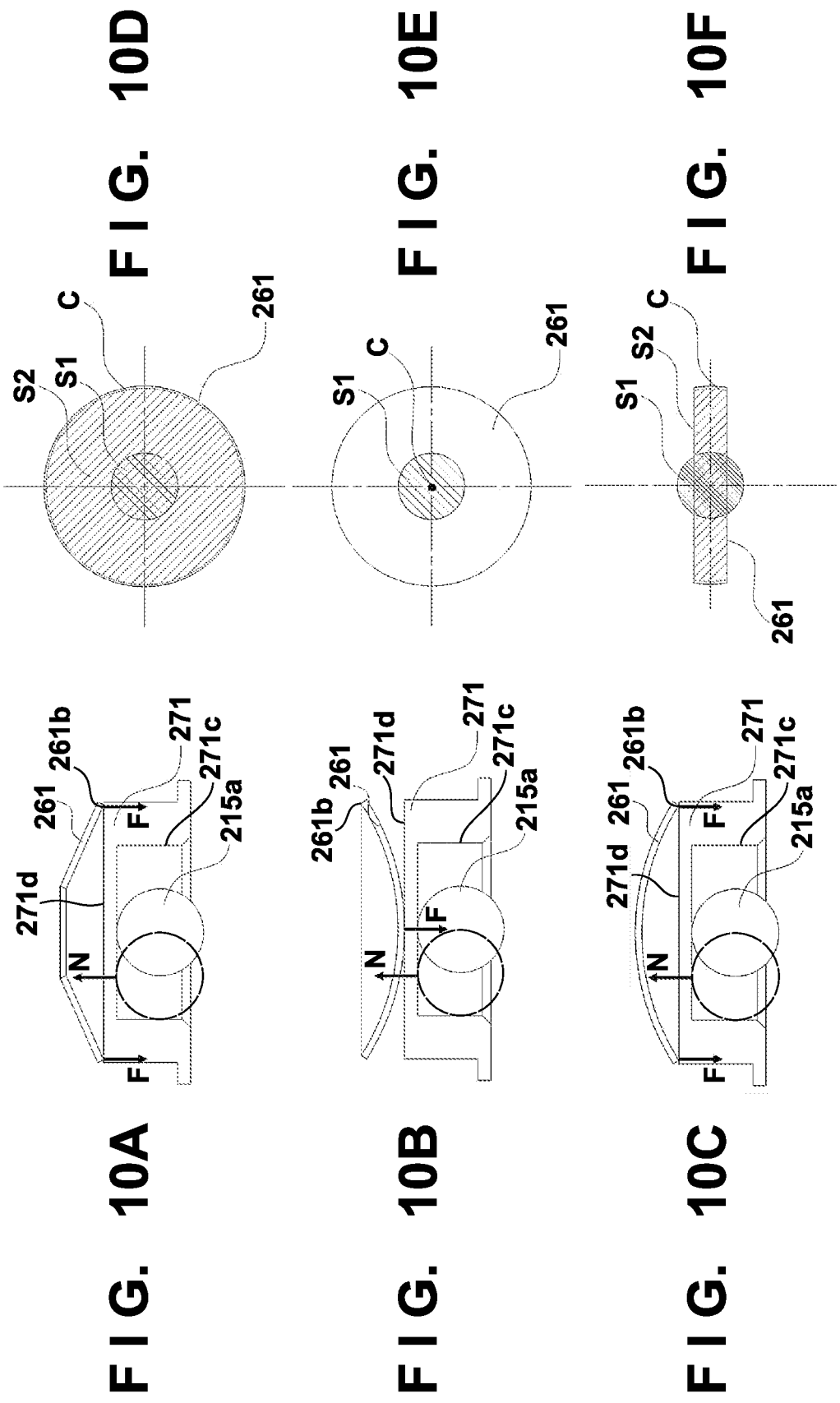

ELECTRONIC DEVICE

BACKGROUND OF THE INVENTION

Field of the Invention

The present invention relates to an electronic device having an image sensor, and more particularly to an electronic device having a position adjustment mechanism of an image sensor.

Description of the Related Art

In recent years, as the number of pixels used in the image sensors has increased, it has been required the distance and inclination of the flange focal length to have high precision. Here, the flange focal length indicates the distance from the mount surface of the main body of an image capturing apparatus to which a lens barrel is mounted to an image sensor. When moving image shooting is performed, the housing of the image capturing apparatus may expand or a unit including the image sensor may deform due to heat generated by the image sensor, and the flange focal length may change.

For example, Japanese Patent Laid-Open No. 2019-207367 discloses an image capturing apparatus having means for storing the relationship between temperature information around an image sensor and the flange focal length of the image capturing apparatus. According to the image capturing apparatus disclosed in Japanese Patent Laid-Open No. 2019-207367, it is possible to adjust the flange focal length according to arbitrary usage environment assumed by the user. On the other hand, in Japanese Patent No. 3173927, it is disclosed that, in an image reading apparatus for converting character and graphic information on a document into an electric signal as image information, a bimetal member is provided between a lens holding member and an image sensor holding member. According to the image reading apparatus disclosed in Japanese Patent No. 3173927, the thermal deformation of the bimetal member is used to suppress the change in the distance between the lens and the image sensor due to the change in temperature of the apparatus.

However, the conventional technology disclosed in Japanese Patent Laid-Open No. 2019-207367 cannot suppress the change in the flange focal length due to heat during shooting. Further, in the prior art disclosed in Japanese Patent No. 3173927, since the bimetal member is installed between the lens holding member and the image sensor holding member, the height of the bimetal member in the optical axis direction must be adjusted at the time of initially adjusting the distance between the lens and the image sensor. In addition, since the amount of thermal deformation of the bimetal member varies depending on its shape and size, there is a concern that an amount of correction may vary among image capturing apparatuses.

SUMMARY OF THE INVENTION

The present invention has been made in consideration of the above situation, and restrains changes in flange focal length due to heat during shooting and reduces variations in flange focal length among apparatuses.

According to the present invention, provided is an electronic device comprising: an image sensor unit that includes an image sensor; a first supporting member that supports the image sensor unit; and an adjusting member, provided between the image sensor unit and the first supporting member, that adjusts an imaging surface of the image sensor and a reference plane of the first supporting member so as to be parallel to each other at a predetermined first distance, wherein the image sensor unit comprises: the image sensor; a second supporting member that supports the image sensor; a third supporting member that is supported by the first supporting member; a shaft portion that fits into a hole provided in the second supporting member so as to be slidable in a direction perpendicular to the imaging surface and supports the second supporting member with respect to the third supporting member; a thermally deformable member that is provided between a top end surface of the shaft portion on a side fitted to the hole and a bottom surface of the hole and deforms in accordance with temperature; and a biasing member that biases the second supporting member toward the third supporting member in a direction perpendicular to the imaging surface, wherein the thermally deformable member suppresses a change in the first distance due to a change in temperature, by deforming in accordance with temperature.

Further, according to the present invention, provided is an electronic device comprising: an image sensor unit that includes an image sensor; a first supporting member that supports the image sensor unit; and an adjusting member, provided between the image sensor unit and the first supporting member, that adjusts an imaging surface of the image sensor and a reference plane of the first supporting member so as to be parallel to each other at a predetermined first distance, wherein the image sensor unit comprises: the image sensor; a second supporting member that supports the image sensor; a third supporting member that is supported by the first supporting member; a ball; a connecting member that fits into a hole provided in the second supporting member so as to be slidable in a direction perpendicular to the imaging surface and has a recessing portion for rotatably sandwiching the ball with the third supporting member; a thermally deformable member that is provided between a top end surface of the connecting member on a side fitted to the hole and a bottom surface of the hole and deforms in accordance with temperature; and a biasing member that biases the second supporting member toward the third supporting member in a direction perpendicular to the imaging surface, wherein the thermally deformable member suppresses a change in the first distance due to a change in temperature, by deforming in accordance with temperature.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is an exploded perspective view illustrating essential parts of the image capturing apparatus according to a first embodiment;

FIGS. 6A to 6D are cross section diagrams of a fitting portion between a base plate and a movable frame according to the first embodiment;

FIGS. 10A to 10F are cross section diagrams illustrating the relationship between loads received by a connecting member according to the second embodiment, and projected views illustrating contact points between the bimetal member and the connecting member and movable regions of a ball on a plane perpendicular to the optical axis.

DESCRIPTION OF THE EMBODIMENTS

Figure 1A:
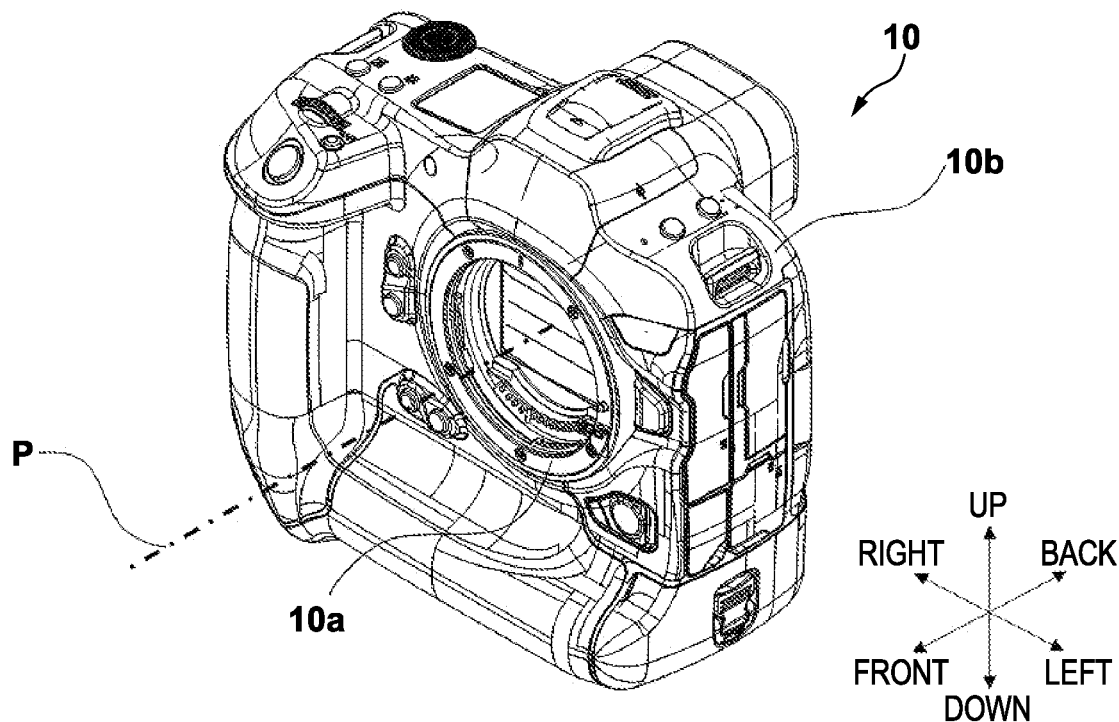
FIGS. 1A and 1B are perspective views illustrating an appearance of an image capturing apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

Preferred embodiments of the present invention will be described in detail below with reference to the accompanying drawings. In each embodiment, an example of an image capturing apparatus to which a holding structure of an image sensor according to the present invention is applied is given.

First Embodiment

Figure 1B:
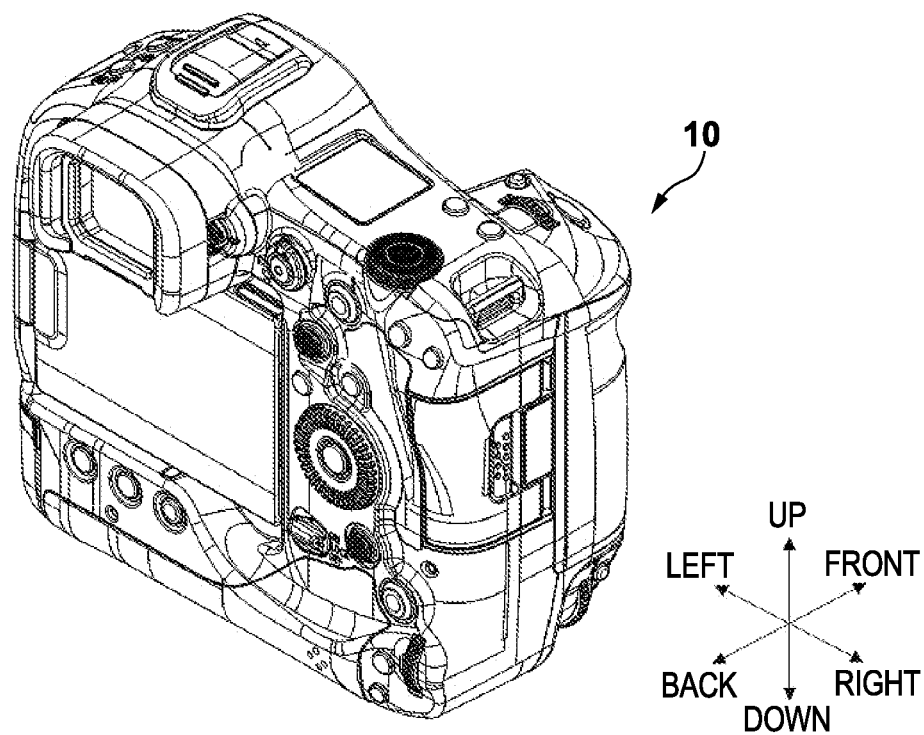

FIGS. 1A and 1B are perspective views of an image capturing apparatus 10 (electronic device). Regarding the direction of the image capturing apparatus 10, the subject side of the image capturing apparatus 10 is defined as the front side, and the up-down direction, the front-back direction, and the left-right direction are defined with respect to the viewing direction of a user facing the back of the image capturing apparatus 10. Accordingly, FIG. 1A is a perspective view of the image capturing apparatus 10 as viewed from the front side, and FIG. 1B is a perspective view of the image capturing apparatus 10 as viewed from the back side. In this embodiment, as an application example, an interchangeable lens camera in which a lens device can be attached to a camera body is given, but the present invention can be applied to various electronic devices having an image sensor.

The image capturing apparatus 10 has an exterior portion 10b, and the exterior portion 10b is composed of a plurality of members. The image capturing apparatus 10 has a mount 10a on the front side, and an interchangeable lens (lens device) (not illustrated) can be attached to the mount 10a. The axis passing through the center of the mount 10a substantially coincides with the optical axis P of the imaging optical system of the interchangeable lens, that is, the imaging optical axis.

FIG. 2 is an exploded perspective view of the parts of the image capturing apparatus 10 as seen from the back side (photographer's side). Note that the exterior portion 10b and so on is not illustrated in FIG. 2. In addition, in FIG. 2 and the subsequent figures, the portions necessary for the explanation of the present invention are illustrated, and the portions unnecessary for explanation are omitted. The image capturing apparatus 10 has a control board 100, an image sensor unit 200, a shutter unit 300 and a base member 400. The base member 400 holds the mount 10a, the image sensor unit 200, and the shutter unit 300.

Figure 3A:
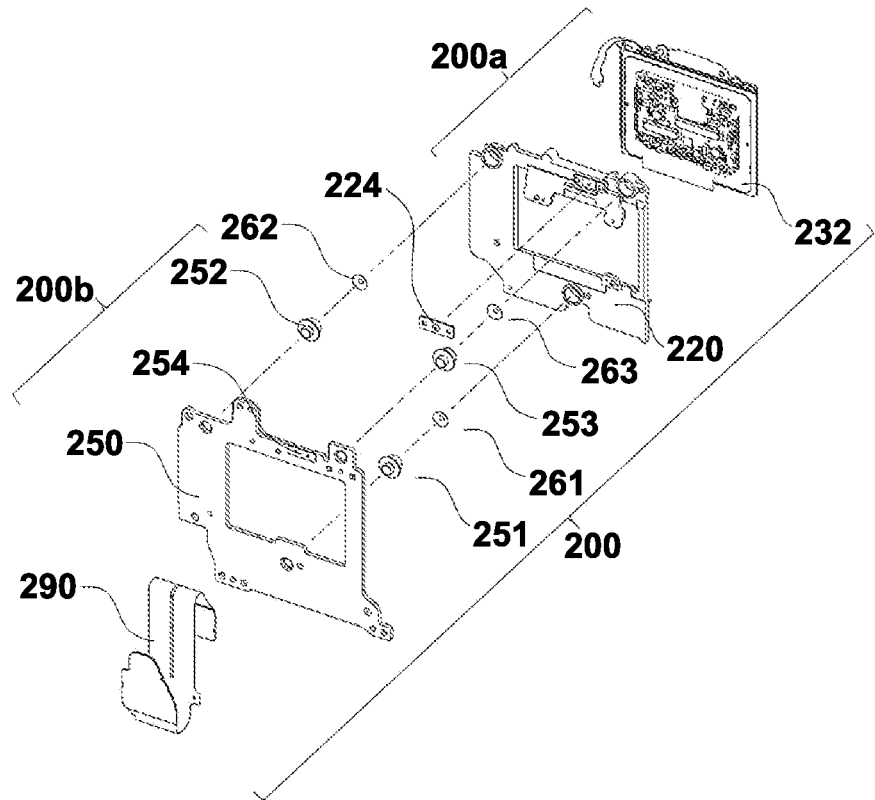
FIGS. 3A and 3B are exploded perspective views of the image sensor unit seen from different directions according to the first embodiment.
Figure 3B:
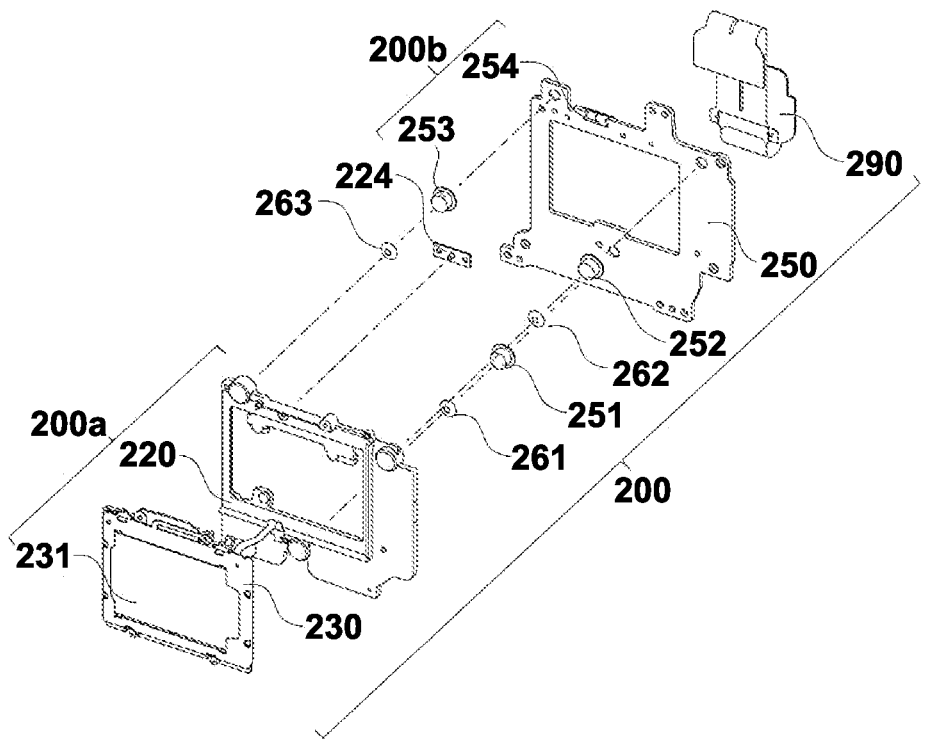

The image sensor unit 200 has a structure capable of adjusting a distance between the imaging surface of an image sensor 230 and the mount 10a (hereinafter referred to as "flange focal length") illustrated in FIGS. 3A and 3B and an inclination of the imaging surface with respect to the base member 400. For example, the image sensor unit 200 is supported on the base member 400 by three screws 600a, 600b, 600c and three adjusting washers 500a, 500b, 500c (adjusting members). An assembler adjusts the thickness of the adjusting washers 500a, 500b, and 500c. This makes it possible to adjust the flange focal length and the inclination of the imaging surface. After completing this adjustment work, the screws 600a, 600b, and 600c are adhesively fixed to a fixing unit of the image sensor unit 200 to prevent them from loosening. If the image capturing apparatus 10 is not an interchangeable lens type camera, the flange focal length is the distance between the imaging surface of the image sensor 230 and a reference plane, which is parallel to the imaging surface, on the base member 400.

The control board 100 and the base member 400 are fixed to the exterior portion 10b. A control IC 101 used for controlling image signals and a connector 102 are mounted on the control board 100. Further, various electronic components (not illustrated) such as chip resistors, ceramic capacitors, inductors, and transistors are mounted on the control board 100.

Next, the image sensor unit 200 will be explained using FIGS. 3A and 3B. FIG. 3A is an exploded perspective view of the image sensor unit 200 viewed from the back side, and FIG. 3B is an exploded perspective view of the image sensor unit 200 viewed from the front side. The image sensor unit 200 has a movable unit 200a and a fixed unit 200b. The movable unit 200a is a movable member including the image sensor 230, and the fixed unit 200b is a support member fixed to the base member 400. The movable unit 200a is supported so as to be displaceable in the optical axis direction with respect to the fixed unit 200b (i.e., the direction perpendicular to the imaging surface of the image sensor 230). Bimetal members 261, 262, and 263 are arranged between the movable unit 200a and the fixed unit 200b, and determine the position of the movable unit 200a in the optical axis direction (i.e., the position of the plane parallel to the imaging surface of the image sensor 230). In addition, the movable unit 200a is magnetically biased in the direction of the optical axis toward the fixed unit 200b by a magnetic attraction plate 224 (biasing member) arranged in the movable unit 200a and a magnetic member 254 (biasing member) arranged in the fixed unit 200b.

The main components of the fixed unit 200b are a base plate 250 and the magnetic member 254. The main components of the movable unit 200a are a movable frame 220, the magnetic attraction plate 224, and an image sensor board 232. The image sensor 230 is mounted on the image sensor board 232. The image sensor 230 may be a Complementary Metal Oxide Semiconductor (CMOS) image sensor, a Charge Coupled Device (CCD) image sensor, or the like, and converts an optical image of a subject into an electrical signal and outputs the electrical signal. An image sensor board 232 on which the image sensor 230 is mounted is adhesively fixed to the movable frame 220. In the movable frame 220, an optical low-pass filter 231, which is an optical element for preventing the occurrence of color moiré, is arranged in front of the image sensor 230.

Figure 4A:
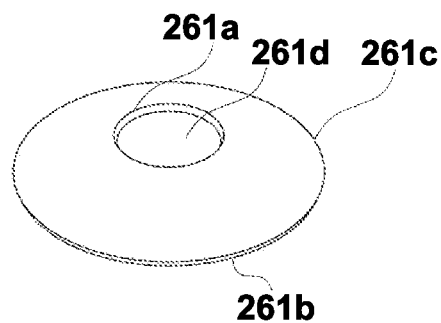
FIGS. 4A to 4D are perspective views and a cross-sectional view illustrating examples of the shapes of bimetal members according to the first embodiment.

When the image sensor 230 heats up due to long-time moving image shooting, for example, the base member 400 may expand in the optical axis direction due to thermal expansion, and the flange focal length may increase. Therefore, the bimetal members 261, 262, and 263 as illustrated in FIG. 4A are provided between the movable unit 200a and the fixed unit 200b. By using thermal deformation of the bimetal members 261, 262, and 263 to displace the optical axis position of the movable unit 200a in a direction that cancels out the change in the flange focal length, the change in the flange focal length due to the heat of the image sensor 230 can be suppressed. Since the amount of thermal deformation of the bimetal members 261, 262, and 263 varies depending on their shapes and sizes, it is desirable to use bimetal members having the same shape and size in each imaging device. Although FIG. 4A illustrates a bowl-shaped bimetal member, examples of other shapes of the bimetal member will be described later. Also, although a bimetal member is described here, it does not have to be a bimetal member as long as the member is a thermally deformable member that deforms according to temperature.

Figure 5A:
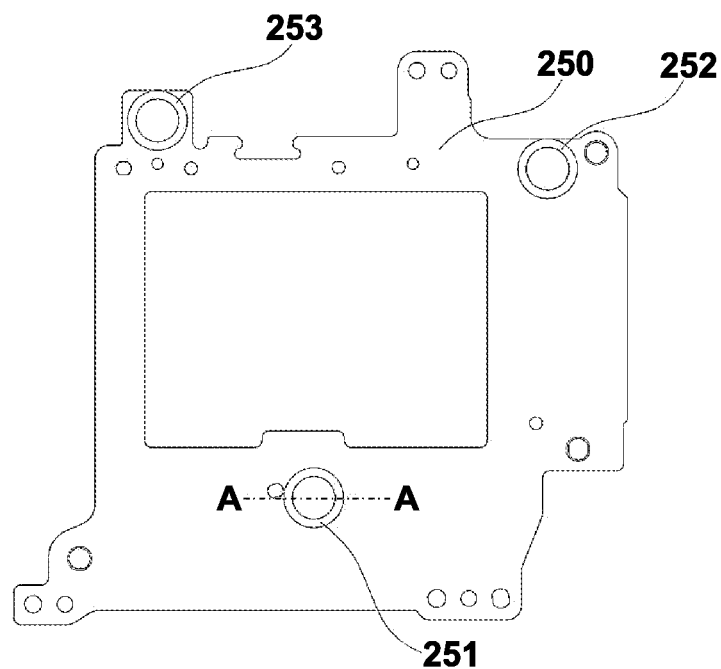
FIG. 5A is a front view of a base plate according to the first embodiment.
Figure 5B:
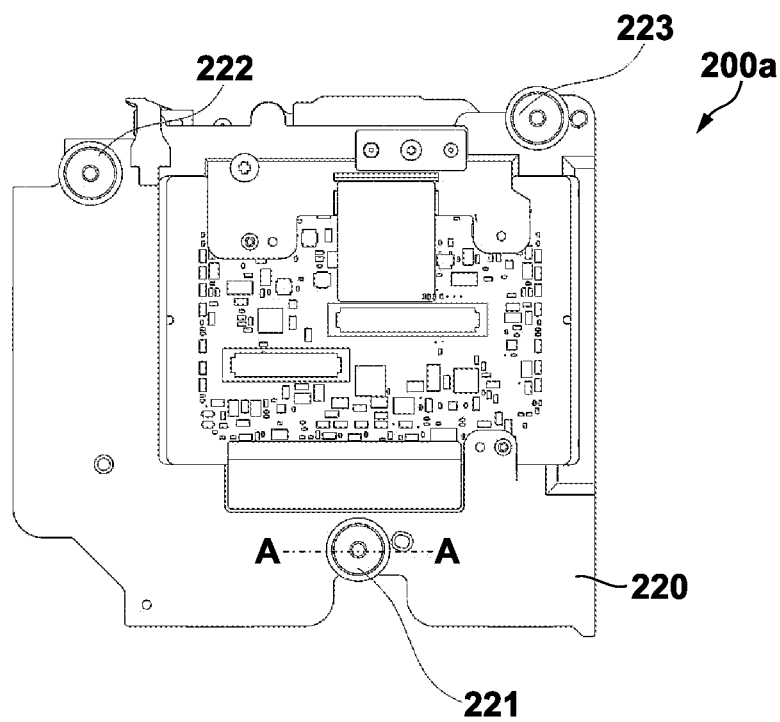
FIG. 5B is a rear view of a movable unit according to the first embodiment.
Figure 6C:
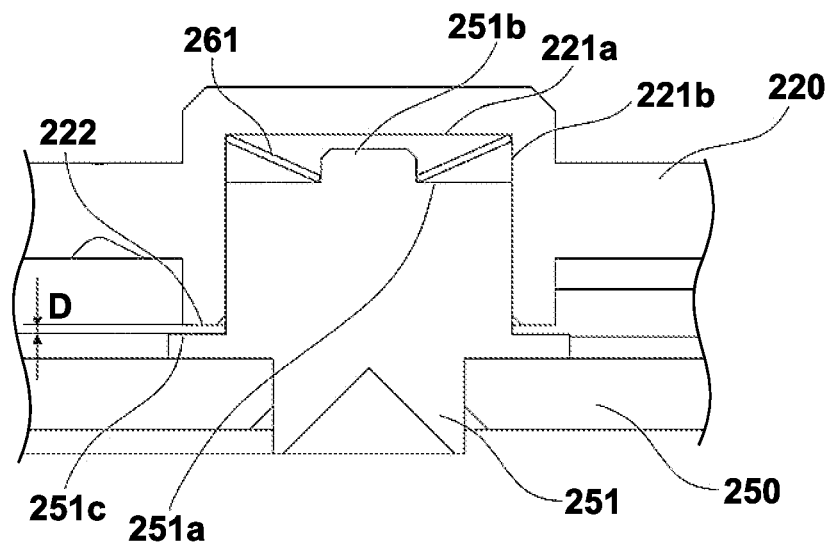

Next, with reference to FIGS. 5A, 5B, and 6A to 6D, the configuration of the bimetal members will be described in detail. FIG. 5A illustrates a front view of the base plate 250 (viewed from the mount 10a side), and FIG. 5B illustrates a rear view of the movable unit 200a. FIG. 6A is an A-A cross-sectional view of the fitting portion of the base plate 250 and the movable frame 220 of the image sensor unit 200 illustrated in FIGS. 5A and 5B, and FIG. 6B is an enlarged view of the area B in FIG. 6A.

The movable frame 220 has holes 221, 222, and 223 that are to be fitted with shafts 251, 252, and 253 attached to the base plate 250, and is slidably supported along the optical axis. The bimetal members 261, 262, and 263 are arranged between the shafts 251, 252, and 253 and the holes 221, 222, and 223, and the position of the movable frame 220 in the optical axis direction is determined by the bimetal members 261, 262, and 263. Only the configuration of the fitting portion concerning the shaft 251, the hole 221, and the bimetal member 261 will be described below, but the configurations of the fitting portions concerning the shafts 252 and 253, the holes 222 and 223, and the bimetal members 262 and 263 are the same.

One end 261a of the bimetal member 261 contacts a bottom surface 221a of the hole 221 of the movable frame 220, and the other end 261b contacts a top end surface 251a of the shaft 251 of the base plate 250. Further, the bimetal member 261 is fitted to the hole 221 so that an inner wall surface 221b of the hole 221 of the movable frame 220 guides an outer peripheral portion 261c of the bimetal member 261. Furthermore, the bimetal member 261 has a through hole 261d centered on the center of gravity of the bimetal member 261, and the through hole 261d is fitted with a shaft 221c provided on the bottom surface 221a of the hole 221 of the movable frame 220.

Alternatively, instead of the shaft 221c provided in the hole 221, a shaft 251b may be provided on the top end surface 251a of the shaft 251 and fitted with the through hole 261d of the bimetal member 261 as illustrated in FIG. 6C.

By providing a guide or fitting structure in this way, it is possible to substantially eliminate the misalignment of the bimetal member 261 in the in-plane direction perpendicular to the optical axis. As a result, even if impact due to dropping or like is applied to the image sensor unit 200, it is possible to prevent contact between the bimetal member 261 and the movable frame 220 from displacing, thereby suppressing positional displacement of the image sensor 230 in the optical axis direction.

The shaft 251 provided on the base plate 250 has a contact portion 251c having a thickness that contacts a bottom portion 222 of the movable frame 220 when the distance in the optical axis direction from the movable frame 220 is reduced by a certain value D. The value D is determined in consideration of the processing tolerance of the shaft 251, the bimetal member 261 and the movable frame 220, and the amount of deformation of the bimetal member 261 due to the heat generated by the image sensor 230. When impact is applied to the image sensor unit 200 due to being dropped or the like, there is a possibility that the bimetal member 261 may be excessively deformed, and the deformation may change the position of the image sensor 230 in the optical axis direction. Therefore, by providing the contact portion 251c, it is possible to prevent the deformation of the bimetal member 261 due to the impact and prevent the occurrence of the positional change described above. Further, the location of the contact portion 251c is not limited to the shaft 251, and the contact portion 251c may be set on the base plate 250.

Figure 7A:
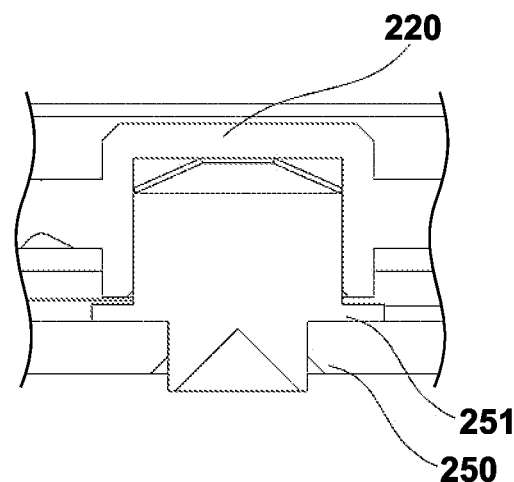
FIGS. 7A to 7C are schematic diagrams illustrating examples of deformations of the bimetal member depending on temperature according to the first embodiment.
Figure 7B:
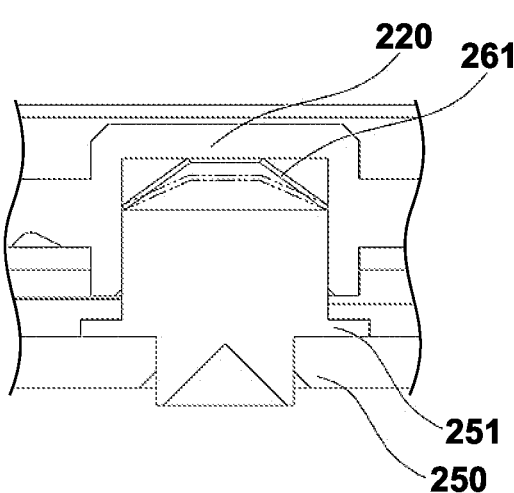
Figure 7C:
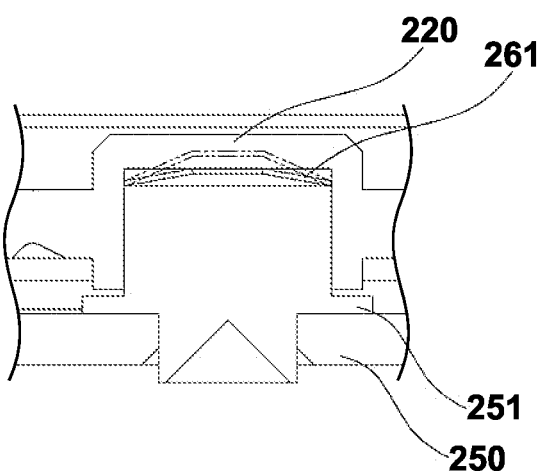

FIGS. 7A-7C are schematic diagrams illustrating how the change in the flange focal length is suppressed by the fitting configuration described above. FIGS. 7A to 7C illustrate cross section diagrams of the bimetal member 261 when the temperature around the bimetal member 261 is normal, high, and low, respectively. Also, in FIGS. 7B and 7C, the shape of the bimetal member 261 at normal temperature is indicated by two-dot-dash lines. As illustrated in FIG. 7B, when the temperature is high, the bimetal member 261 deforms such that its height increases in the optical axis direction, and the movable frame 220 moves in the direction that decreases the flange focal length (direction toward the mount 10b). On the other hand, when the temperature is low, the bimetal member 261 deforms such that its height decreases in the optical axis direction, and the movable frame 220 moves in the direction that increases the flange focal length (direction away from the mount 10b).

That is, when the image sensor 230 heats up, the shape of the bimetal member 261 changes, and the position of the movable frame 220 on the optical axis moves in the direction in which the flange focal length decreases. At this time, the base member 400 expands in the optical axis direction due to thermal expansion, and the image sensor unit 200 moves in the direction in which the flange focal length increases. Therefore, it is possible to suppresses a change in the flange focal length due to heat of the image sensor 230.

Conversely, when shooting in a low-temperature environment such as a cold region, the shape of the bimetal member 261 changes, which moves the position of the movable frame 220 on the optical axis in the direction in which the flange focal length increases. At this time, the base member 400 shrinks in the optical axis direction, and the image sensor unit 200 moves in the direction in which the flange focal length decreases. Therefore, it is possible to suppress a change in the flange focal length due to a temperature drop.

Figure 4B:
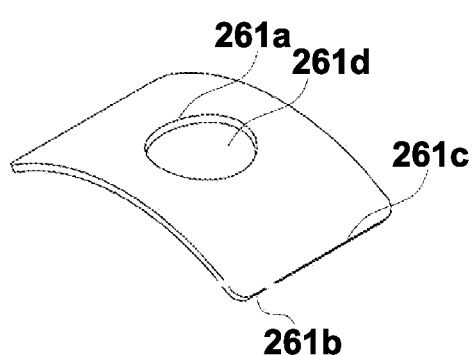

Next, an example of the shape of the bimetal member 261 will be explained. FIG. 4A illustrates an example of the bimetal member 261 having a circular outer shape, and FIG. 4B illustrates an example of the bimetal member 261 having a rectangular outer shape, with the portion near the center protruding from the peripheral portion. Although FIGS. 4A and 4B exemplify shapes having height in the optical axis direction, a flat plate having no height may also be used.

On the other hand, in the case of the shapes illustrated in FIGS. 4A and 4B, the ends 261b and 261c that are to contact the shaft 251 and the hole 221, respectively, are edges. Therefore, during the deformation process, the friction with the mating member becomes large, which may hinder the deformation. In view of the above concerns, the shapes illustrated in FIGS. 4C and 4D may be used.

Figures 4C, 4D:
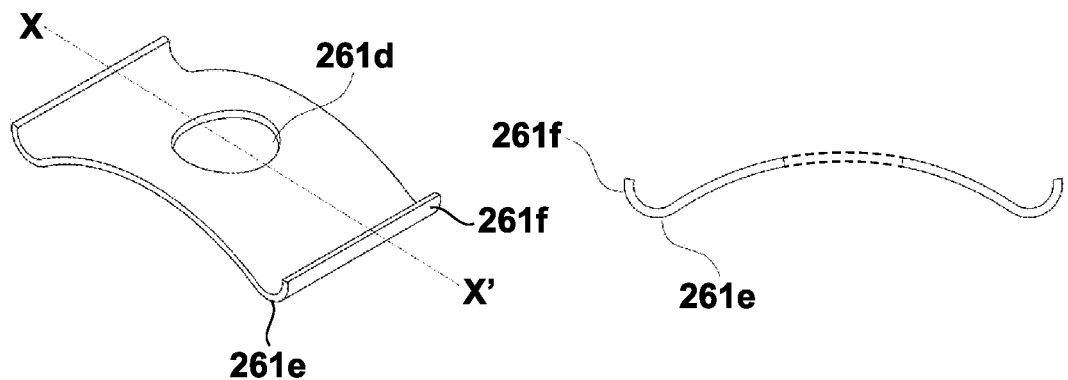

FIG. 4C illustrates a shape having a curved surface portion 261e that contacts the top end surface 251a of the shaft 251 and a curved surface portion 261f that fits the inner wall surface 221b of the movable frame 220. FIG. 4D is a cross section diagram taken along the line X-X' of FIG. 4C. As illustrated in FIG. 4C, by forming the contact portion 261e that contacts with the top end surface 251a of the shaft 251 of the base plate 250 as a curved surface, it is possible to reduce the friction with the mating member during the deformation process. Therefore, even when the biasing force in the optical axis direction is applied by the magnetic attraction plate 224 and the magnetic member 254, a configuration is realized in which the deformation of the bimetal member 261 is not hindered.

Figure 6D:
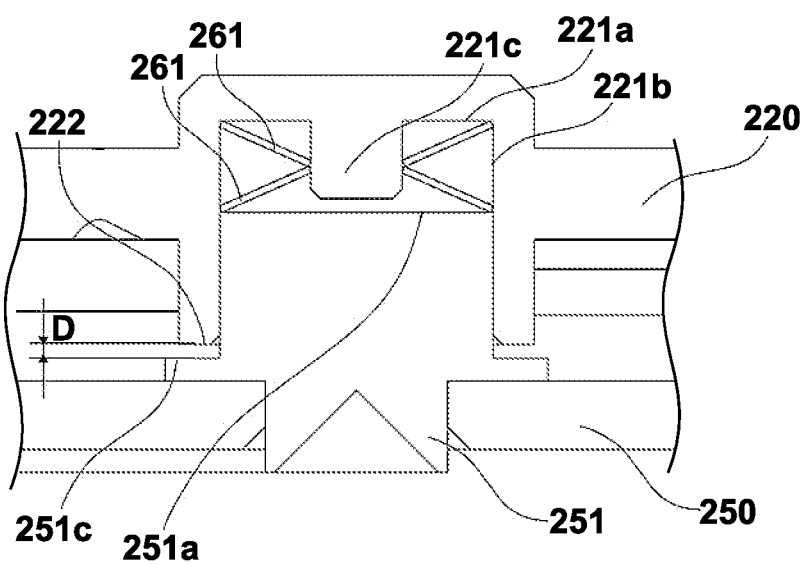

Further, as illustrated in FIG. 6D, a plurality of bimetal members 261 (a plurality of temperature deformable parts) may be arranged. At this time, it is desirable that the bimetal members 261 are stacked alternately. By alternately stacking the bimetal members 261, improvement of springiness and an increase in thermal deformability of the bimetal members as a whole can be expected. That is, it is possible to improve the ability to correct the change in the flange focal length while preventing deformation of the bimetal members due to impact caused by dropping or the like.

Moreover, the bimetal members to be stacked do not have to have the same shape. For example, of the two stacked bimetal members, one of the bimetal members that contacts the bottom surface 221a of the movable frame 220 may have a flat plate shape with no height in the optical axis direction, and the other bimetal member that contacts the top end surface 251a of the shaft 251 may have a shape having a height in the optical axis direction. By making the bimetal member on the side closer to the image sensor 230, which is the heat source, in a flat plate shape, the contact area can be increased and heat transfer property can be improved.

Also, a space 221e (a space in which the bimetal member 261 is arranged) formed by the hole 221 of the movable frame 220 and the top end surface 251a of the shaft 251 illustrated in FIG. 6B may be filled with heat transfer grease. As a result, heat transfer property from the image sensor 230 to the bimetal member 261 can be improved. As a result, deformability of the bimetal member 261 due to the heat generated by the image sensor 230 is increased, so an improvement in ability to correct the change in the flange focal length can be expected.

If the prior art disclosed in Japanese Patent No. 3173927 is applied, the only member that can adjust the flange focal length is the bimetal member, so it is necessary to adjust the height of the bimetal member in the direction of the optical axis when initially adjusting the flange focal length. On the other hand, in the present embodiment, in addition to the bimetal members, additional flange focal length adjusting members (adjusting washers 500a, 500b, and 500c) are provided, so that during the initial adjustment of the flange focal length at the time of assembling the image capturing apparatus 10, adjustment of heights of the bimetal members 261, 262, and 263 is not necessary. Therefore, it is possible to make the flange focal lengths of imaging devices constant. Furthermore, according to the present embodiment, since the bimetal members 261, 262, and 263 can be placed near the image sensor, which is a heat source, ability to correct the flange focal length can be obtained efficiently.

As described above, according to the present embodiment, it is possible to effectively suppress the change in the flange focal length due to heat during shooting while eliminating variations in the flange focal lengths between apparatuses at the time of assembling the apparatuses.

Second Embodiment

Next, a second embodiment of the present invention will be described.

In the second embodiment, a case where the image sensor unit 200 is equipped with an image blur correction mechanism that can displace the image sensor unit 200 in any direction within a plane perpendicular to the optical axis will be described. Note that the configuration, other than the image sensor unit 200, described in the first embodiment with reference to FIGS. 1A, 1B, and 2 can be used in the second embodiment, so description thereof will be omitted here.

First, the image sensor unit 200 in the second embodiment will be described with reference to FIGS. 8A and 8B. Note that the same reference numerals are given to the same configurations as those described in the first embodiment with reference to FIGS. 3A and 3B, and the description thereof will be omitted as appropriate.

Figure 8A:
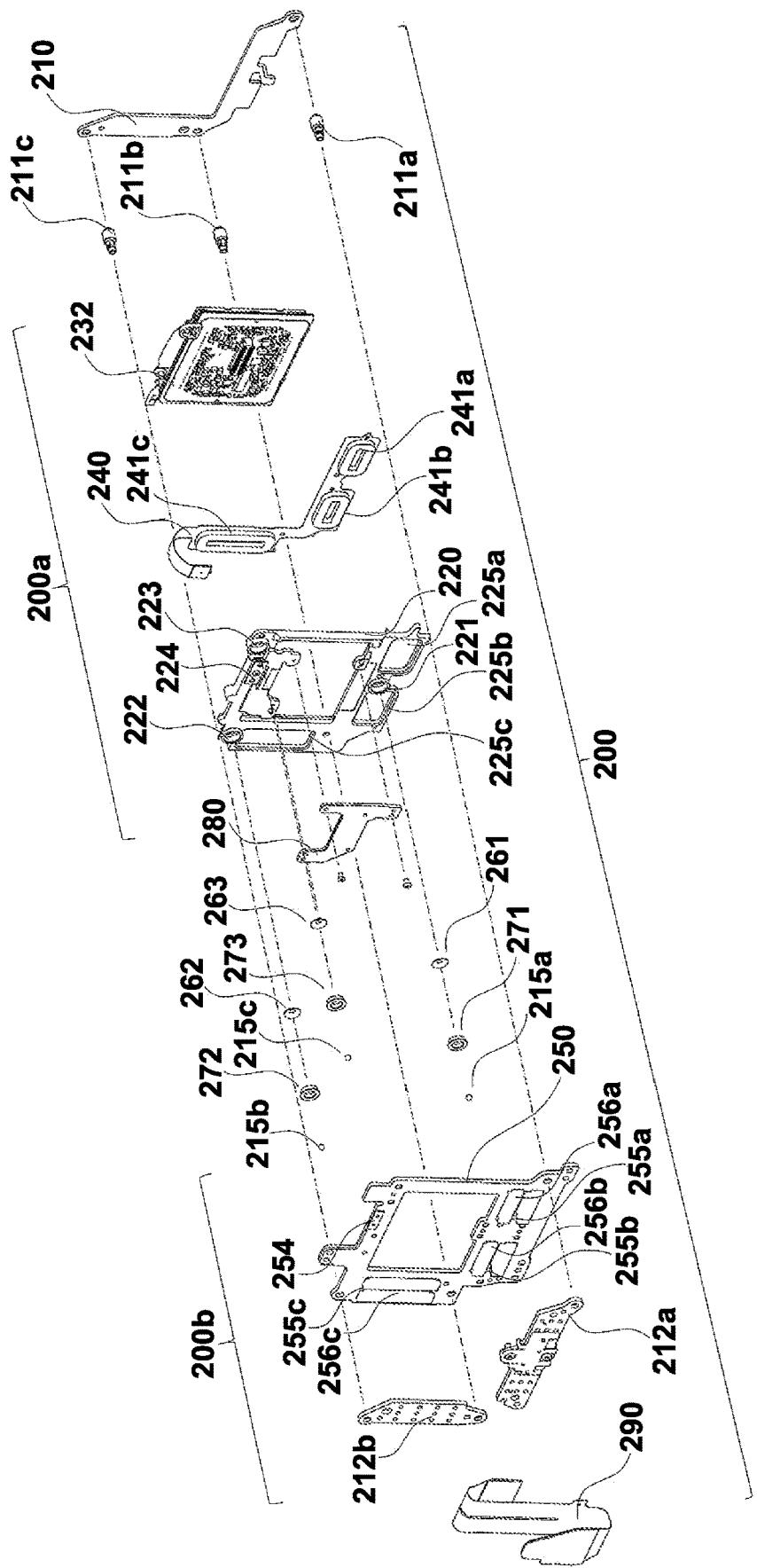
FIG. 8A is an exploded perspective view of an image sensor unit according to a second embodiment.
Figure 8B:
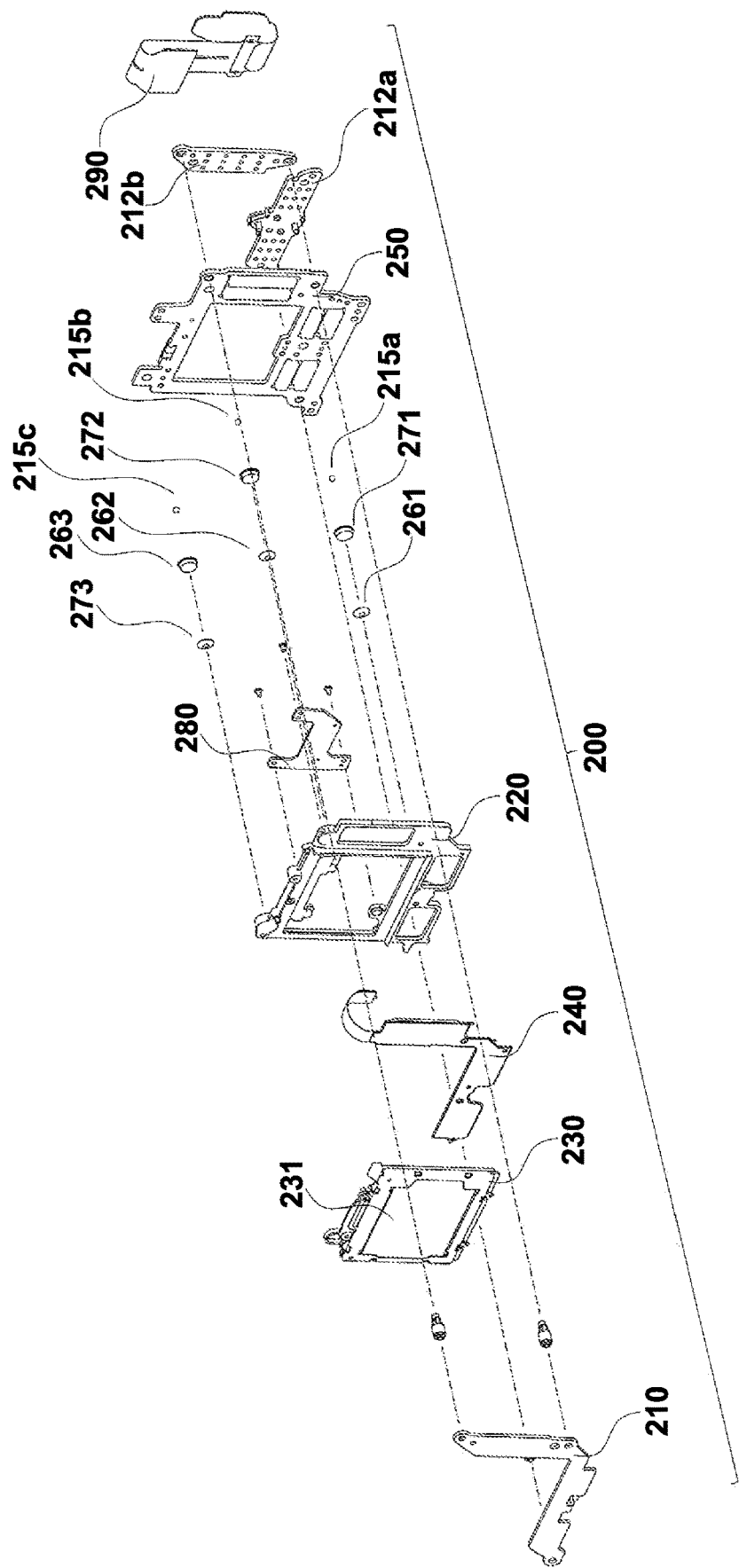
FIG. 8B is an exploded perspective view of the image sensor unit seen from different direction according to the second embodiment.

FIG. 8A is an exploded perspective view of the image sensor unit 200 viewed from the back side, and FIG. 8B is an exploded perspective view of the image sensor unit 200 viewed from the front side. The image sensor unit 200 has the movable unit 200a and the fixed unit 200b. The movable unit 200a is a movable member including the image sensor 230, and the fixed unit 200b is a support member fixed to the base member 400. Also, the movable unit 200a is magnetically biased toward the fixed unit 200b in the optical axis direction by the magnetic attraction plate 224 arranged in the movable unit 200a and the magnetic member 254 arranged in the fixed unit 200b. The movable unit 200a is supported by the fixed unit 200b so as to be displaceable in an arbitrary direction within a plane orthogonal to the optical axis P with respect to the fixed unit 200b. By moving the movable unit 200a in a direction orthogonal to the optical axis P, an optical image stabilization operation is realized.

The main components of the fixed unit 200b in the second embodiment are a front yoke 210, the base plate 250, rear yokes 212a and 212b and the magnetic member 254. Further, the main components of the movable unit 200a in the second embodiment are the movable frame 220, the magnetic attraction plate 224, the image sensor board 232, and a flexible board 240. The flexible board 240 and a flexible board 290 connect the movable unit 200a and the control board 100. Both the flexible board 290 and the flexible board 240 are flexible printed boards.

The movable frame 220 is formed with three openings 225a, 225b and 225c. Also, the flexible board 240 has three coils 241a, 241b and 241c mounted thereon. The flexible board 240 is incorporated into the movable frame 220 from the front side and adhered to be fixed, and the coils 241a, 241b and 241c are accommodated inside the openings 225a, 225b and 225c, respectively.

The movable frame 220 includes bimetal members 261, 262 and 263 and connecting members 271, 272 and 273, and the movable frame 220 and the base plate 250 sandwich balls 215a, 215b and 215c with bimetal members 261, 262 and 263 and the connecting members 271, 272 and 273, thereby, the balls 215a, 215b and 215c are rotatably supported. The position of the movable frame 220 along the optical axis P is determined by the bimetal members 261 to 263. When the temperature around the bimetal members 261 to 263 changes, the bimetal members 261 to 263 deform such that their heights in the optical axis direction change, as described with reference to FIGS. 7A to 7C. This deformation is used to realize a configuration that cancels out the change in the flange focal length due to heat generated by the image sensor 230. A detailed configuration around the bimetal members 261 to 263 will be described later.

Struts 211a, 211b and 211c are provided on the front yoke 210 illustrated in FIGS. 8A and 8B so as to erect toward the base plate 250. One end of each of the struts 211a, 211b and 211c is press-fitted into the base plate 250, and the front yoke 210 and the base plate 250 are joined so as to sandwich the movable frame 220 therebetween.

Openings 255a, 255b and 255c are formed in the base plate 250 at different positions when viewed from the direction of the optical axis P. Magnets 256a, 256b and 256c are incorporated in the openings 255a, 255b and 255c, respectively. When viewed from the direction of the optical axis P, the magnets 256a, 256b, 256c are formed to have the same shape at substantially the same positions as the corresponding coils 241a, 241b and 241c. The magnets 256a, 256b and 256c are arranged at positions such that the centers of the magnets 256a, 256b and 256c substantially correspond to the centers of the coils 241a, 241b and 241c mounted on flexible board 240, respectively. A hall element is mounted inside the windings of each of the coils 241a, 241b and 241c.

Thus, the magnets 256a, 256b and 256c placed on the base plate 250 form a magnetic field, and the coils 241a, 241b and 241c are arranged within the magnetic field environment. A control unit controls the current in each of these coils to generate Lorentz force in each coil, and the movable frame 220 can be displaced in an arbitrary direction within a plane perpendicular to the optical axis P using the Lorentz force as thrust force. Hall elements are mounted inside the coils 241a, 241b, and 241c, respectively, and detect changes in magnetic force due to relative movement of the movable frame 220. Based on the detection signal of each Hall element, the amount of displacement of the movable unit 200a relative to the fixed unit 200b, that is, the amount of displacement in an arbitrary direction within a plane perpendicular to the optical axis P can be detected.

The image blur directions in the image capturing apparatus 10 are the pitch direction, yaw direction, and roll direction. The pitch direction and the yaw direction are two rotational directions about mutually orthogonal axes which are perpendicular to the optical axis P of the imaging optical system, and the roll direction is the rotational direction about an axis parallel to the optical axis P. In a case of correcting image blur in the pitch direction, which is rotation about the axis in the left-right direction, the movable unit 200a translates in the up-down direction. In a case of correcting image blur in the yaw direction, which is rotation about the axis in the up-down direction, the movable unit 200a translates in the left-right direction. When correcting image blur in the roll direction, which is rotation about the axis in the front-back direction, the movable unit 200a rotates about an axis parallel to the axis in the front-back direction.

Next, referring to FIGS. 9A and 9B, the configuration of the fitting portions between the bimetal members 261, 262 and 263 and the connecting members 271, 272 and 273 will be described. Only the configuration of the fitting portion between the bimetal member 261 and the connection member 271 will be described below, but the fitting portions between the bimetal members 262 and 263 and the connection members 272 and 273 have the same configuration.

Figure 9A:
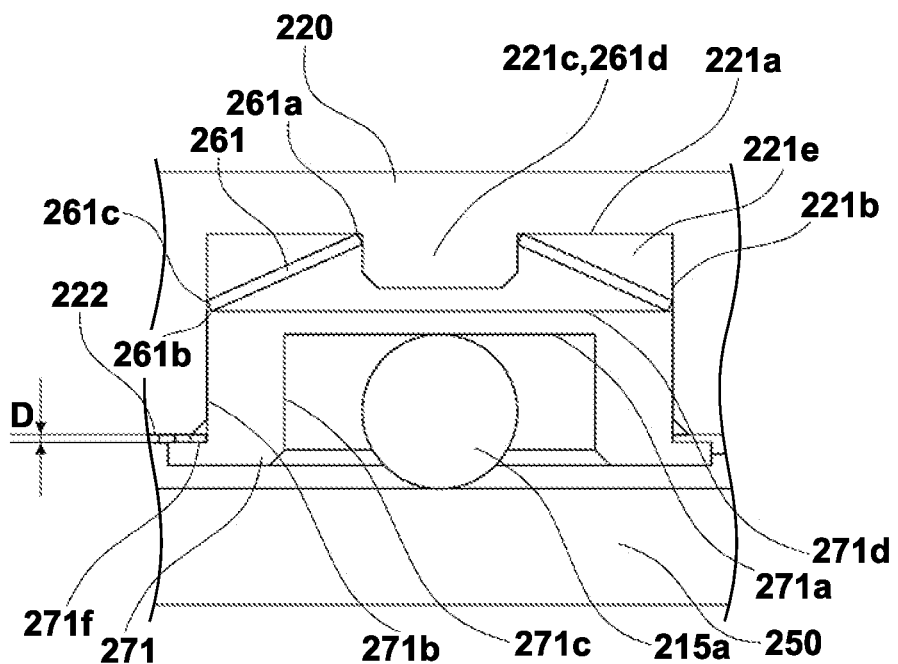
FIGS. 9A and 9B are sectional views of a fitting portion between a base plate and a movable frame according to the second embodiment.
Figure 9B:
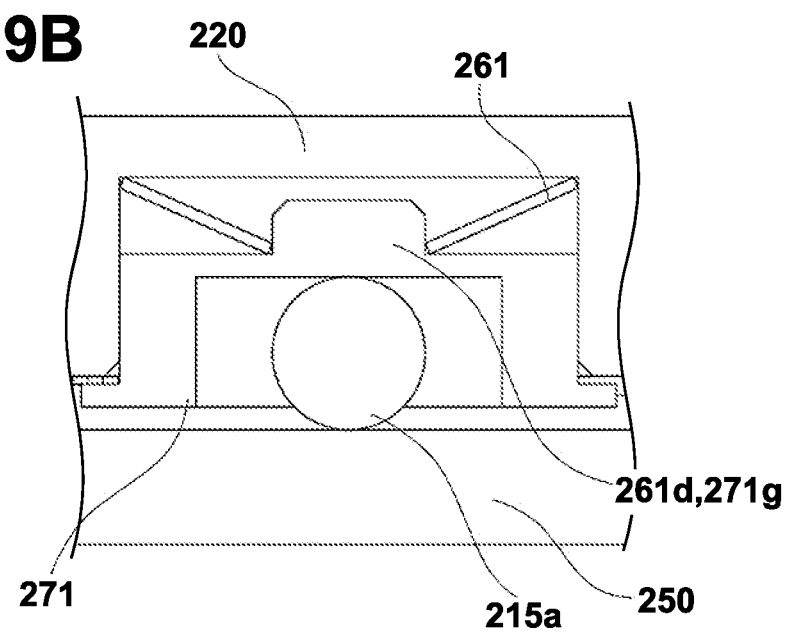

FIGS. 9A and 9B are cross section diagrams of a fitting portion between the base plate 250 and the movable frame 220 of the image sensor unit 200. The connecting member 271 has a rollable horizontal surface 271a that is in contact with the ball 215a. Also, the connecting member 271 has an outer peripheral surface 271b that fits with the inner wall surface 221b of the hole 221 of the movable frame 220.

Next, the configuration of the restricting portion that restricts the rolling range of the ball 215a will be described. As a conventional image stabilization mechanism, a configuration in which a regulating portion is provided on the movable frame 220 is known. However, if the regulating portion is provided on the movable frame 220 in the present embodiment, a sufficient fitting length between the outer peripheral surface 271b of the connecting member 271 and the inner wall surface 221b of the movable frame 220 cannot be ensured. Therefore, when the movable frame 220 is moved within the plane orthogonal to the optical axis, the connecting member 271 tends to tilt with respect to the plane, which may impair controllability during image stabilization operation.

Alternatively, if the height of the connecting member 271 in the optical axis direction is increased to secure the fitting length, the height of the movable unit 200a in the optical axis direction increases, which may increase the size of the image sensor unit 200.

Therefore, in this embodiment, the connecting member 271 is designed to have a shape having an inner wall surface 271c that restricts the rolling range of the ball 215a. By providing the connecting member 271 with the regulating portion, it is possible to ensure the fitting length of the connecting member 271 and the movable frame 220, and to suppress the inclination of the connecting member 271 with respect to the in-plane direction.

On the other hand, the bimetal member 261 is arranged between the connecting member 271 and the movable frame 220 and determines the position of the movable frame 220 in the optical axis direction. One end 261a of the bimetal member 261 contacts the bottom surface 221a of the hole 221 of the movable frame 220, and the other end 261b contacts a top end surface 271d of the connecting member 271. Further, an outer peripheral portion 261c of the bimetal member 261 is fitted to the inner wall surface 221b of the movable frame 220 so as to use the inner wall surface 221b as a guide. Therefore, the bimetal member 261 and the connecting member 271 can be displaced in the in-plane direction together with the movable frame 220 during image stabilization operation. Furthermore, the shape of the bimetal member changes as the temperature of the image sensor unit 200 changes, and accordingly the position of the movable unit 200a in the optical axis direction is adjusted. That is, it is possible to cancel the change in the flange focal length due to heat generated in the image sensor 230.

Next, detailed configurations of the connecting member 271 and bimetal member 261 will be described.

The connecting member 271 has an abutment portion 271f that abuts the bottom portion 222 of the movable frame 220 in a case where the distance from the movable frame 220 in the optical axis direction is shortened by a certain value D. The value D is determined in consideration of the processing tolerance of the connecting member 271, the bimetal member 261 and the movable frame 220 and the amount of deformation of the bimetal member 261 due to the heat generated in the image sensor 230. If an impact is applied to the image sensor unit 200 due to dropping or the like, the bimetal member 261 may be excessively deformed, and plastic deformation may change the position of the image sensor 230 in the optical axis direction. Therefore, by providing the abutment portion 271f, it is possible to prevent the deformation of the bimetal member 261 due to the impact and prevent the occurrence of the above concerned incident. Note, the installation location of the abutment portion 271f is not limited to the connecting member 271, and may be installed on the base plate 250.

The bimetal member 261 has the through hole 261d centered on the center of gravity of the bimetal member 261, and the through hole 261d is fitted with the shaft 221c provided on the bottom surface 221a inside the hole 221 of the movable frame 220.

Alternatively, as illustrated in FIG. 9B, a configuration in which a shaft portion 271g provided on the top end surface 271d of the connecting member 271 fits into the through hole 261d of the bimetal member 261 may be used. By providing such a fitting configuration, it is possible to restrict the displacement of the bimetal member 261 in the in-plane direction. Therefore, even if an impact is applied to the image sensor unit 200 due to dropping or the like, it is possible to prevent displacement of contact between the bimetal member 261 and the movable frame 220, thereby suppressing the displacement of the image sensor 230 in the optical axis direction.

Next, the shape of the bimetal member 261 will be explained. The shape of the bimetal member 261 may be similar to the shape illustrated in FIG. 6A in the first embodiment. Also, as illustrated in FIG. 6D, a plurality of bimetal members 261 may be arranged. However, the contact point C between the end 261b of the bimetal member 261 and the top end surface 271d of the connecting member 271 preferably satisfies the following conditions on the projection plane in the optical axis direction.

Condition 1: A contact point C must be outside a movable area S1 of the ball 215a.

Condition 2: An area S2 defined by connecting the contact points C includes the movable area S1 of the ball 215a.

FIG. 10A is a cross section diagram illustrating the relationship between loads that the connecting member 271 receives. A circle indicated by a two-dot-dash line in the figure indicates a state in which the ball 215a is in contact with the inner wall surface 271c of the connecting member 271. FIG. 10D is a diagram illustrating the contact point C between the end 261b of the bimetal member 261 and the top end surface 271d of the connecting member 271 and the movable area of the ball 215a on the projection plane viewed from the optical axis direction. FIGS. 10A and 10D illustrate the case where the shape and arrangement of the bimetal member 261 satisfy both Condition 1 and Condition 2 described above.

On the other hand, FIGS. 10B and 10E illustrate a case where both Condition 1 and Condition 2 are not satisfied. FIGS. 10C and 10F illustrate a case where Condition 1 is satisfied but Condition 2 is not satisfied. If the bimetal member 261 has the shape and is arranged as illustrated in FIGS. 10B and 10E, the connecting member 271 receives a moment in the direction that makes the connecting member 271 to tilt with respect to the movable frame 220. Therefore, there is a concern that controllability during image stabilization operation may be impaired. If the bimetal member 261 has the shape and is arranged as illustrated in FIGS. 10C and 10F, the connecting member 271 receives a moment in the direction that makes the connecting member 271 to tilt with respect to the movable frame 220 when the ball 215a moves outside the area S2 which is defined by connecting the contact points C. Therefore, with the configuration that the contact point C between the end portion 261b of the bimetal member 261 and the top end surface 271d of the connecting member 271 satisfies the above two conditions, the inclination of the connecting member 271 is suppressed and it is possible to prevent impairing controllability during image stabilization operation.

Note that with the configuration as illustrated in FIG. 9B, the contact point C under Condition 1 is the contact point between the end 261b of the bimetal member 261 and the bottom surface 221a of the hole 221 of the movable frame 220.

Further, the space 221e (the space in which the bimetal member 261 is arranged) formed by the hole 221 of the movable frame 220 and the top end surface 271d of the connecting member 271 in FIGS. 9A and 9B may be filled with heat transfer grease. As a result, heat transfer from the image sensor 230 to the bimetal member 261 can be improved. Accordingly, since the amount of deformation of the bimetal member 261 increases as the heat generated in the image sensor 230 increases, an improvement in the effect of correcting changes in the flange focal length can be expected.

As described above, according to the second embodiment, in addition to the same effect as the first embodiment, the movable unit can be displaced in a plane perpendicular to the optical axis without impairing the effect of correcting the change in flange focal length.

Third Embodiment

Next, a third embodiment of the present invention will be described.

In the third embodiment, an example in which a rail shape is added to the connecting member 271 will be described. Note, the same reference numerals are given to the same configurations as in the first embodiment and the second embodiment, and the description thereof will be omitted as appropriate.

Figure 11A:
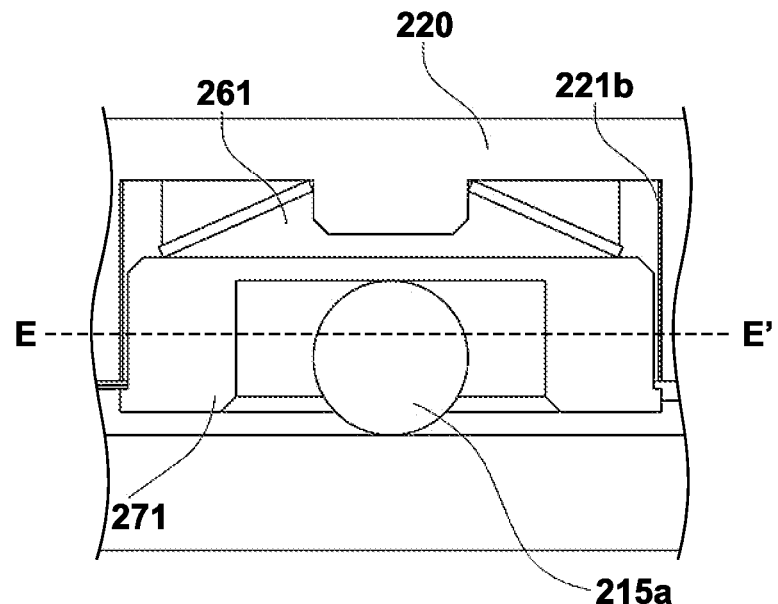
FIGS. 11A and 11B are sectional views of a fitting portion between a base plate and a movable frame according to a third embodiment.
Figure 11B:
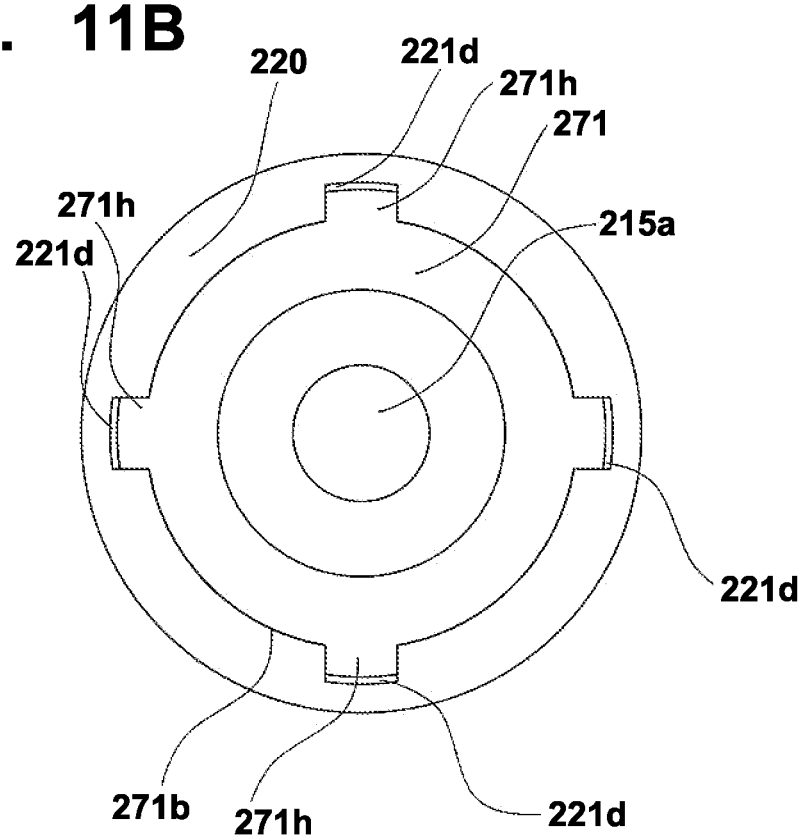

FIG. 11A is a cross section diagram of the fitting portion of the base plate 250 and the movable frame 220 of the image sensor unit 200, and FIG. 11B is a cross section diagram taken along E-E' of FIG. 11A. Rail portions 271h (protruding portion) each extending in the optical axis direction protrude on the outer peripheral surface 271b of the connecting member 271. On the other hand, the inner wall surface 221b of the movable frame 220 is provided with recessing portions 221d extending in the optical axis direction and into which the rail portions 271h are fitted. At least three or more rail portions 271h and recessing portions 221d are preferably provided in order to suppress inclination of the connecting member 271 with respect to the movable frame 220. With this configuration, it is possible to provide an image capturing apparatus that suppresses the change in the flange focal length due to heat generated in the image sensor without impairing controllability during image stabilization operation.

In the example illustrated in FIGS. 11A and 11B, the case where the protruding rail portions 271h are provided on the outer peripheral surface 271b of the connecting member 271 and the recessing portions 221d into which the rail portions 271h are fitted are provided on the inner wall surface 221b of the movable frame 220. However, the present invention is not limited to this. For example, the inner wall surface 221b of the movable frame 220 may be provided with protruding rail portions, and the outer peripheral surface 271b of the connecting member 271 may be provided with recessing portions into which the rail portions are fitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197873, filed Dec. 6, 2021 which is hereby incorporated by reference herein in its entirety.

What is claimed is:

1. An electronic device comprising:
   an image sensor unit that includes an image sensor;
   a first supporting member that supports the image sensor unit; and
   an adjusting member, provided between the image sensor unit and the first supporting member, that adjusts an imaging surface of the image sensor and a reference plane of the first supporting member so as to be parallel to each other at a predetermined first distance,
   wherein the image sensor unit comprises:
     the image sensor;
     a second supporting member that supports the image sensor;
     a third supporting member that is supported by the first supporting member;
     a shaft portion that fits into a hole provided in the second supporting member so as to be slidable in a direction perpendicular to the imaging surface and supports the second supporting member with respect to the third supporting member;
     a thermally deformable member that is provided between a top end surface of the shaft portion on a side fitted to the hole and a bottom surface of the hole and deforms in accordance with temperature; and
     a biasing member that biases the second supporting member toward the third supporting member in a direction perpendicular to the imaging surface,
   wherein the thermally deformable member suppresses a change in the first distance due to a change in temperature, by deforming in accordance with temperature.

2. The electronic device according to claim 1, wherein the shaft portion has a portion that fits into the hole and a portion that fixes the third supporting member by fitting into a hole provided in the third supporting member.

3. The electronic device according to claim 1, wherein the shaft portion has an abutment portion that abuts against the second supporting member so that a distance between the top end surface of the shaft portion and the bottom surface of the hole does not become shorter than a predetermined second distance.

4. The electronic device according to claim 1, wherein the thermally deformable member has a through hole centered on a center of gravity of the thermally deformable member, and
   wherein the hole has on its bottom a protruding portion that fits into the through hole.

5. The electronic device according to claim 1, wherein the thermally deformable member has a through hole centered on a center of gravity of the thermally deformable member, and
   wherein the shaft portion has on its top end surface a protruding portion that fits into the through hole.

6. The electronic device according to claim 1, wherein the thermally deformable member has a shape in which a portion near its center is raised from its peripheral portion.

7. The electronic device according to claim 1, wherein the thermally deformable member has a shape whose peripheral portion is curved.

8. The electronic device according to claim 1, wherein the thermally deformable member has a flat plate shape.

9. The electronic device according to claim 1, wherein the thermally deformable member is formed by combining a plurality of temperature deformable parts.

10. The electronic device according to claim 1, wherein the thermally deformable member is made of bimetal.

11. The electronic device according to claim 1, wherein the adjusting member is a washer, and
    wherein the image sensor unit is installed to the first supporting member by a screw via the washer.

12. The electronic device according to claim 1, wherein heat transfer grease is filled to a space where the thermally deformable member is provided.

13. An electronic device comprising:
    an image sensor unit that includes an image sensor;
    a first supporting member that supports the image sensor unit; and
    an adjusting member, provided between the image sensor unit and the first supporting member, that adjusts an imaging surface of the image sensor and a reference plane of the first supporting member so as to be parallel to each other at a predetermined first distance,
    wherein the image sensor unit comprises:
      the image sensor;
      a second supporting member that supports the image sensor;
      a third supporting member that is supported by the first supporting member;
      a ball;
      a connecting member that fits into a hole provided in the second supporting member so as to be slidable in a direction perpendicular to the imaging surface and has a recessing portion for rotatably sandwiching the ball with the third supporting member;
      a thermally deformable member that is provided between a top end surface of the connecting member on a side fitted to the hole and a bottom surface of the hole and deforms in accordance with temperature; and
      a biasing member that biases the second supporting member toward the third supporting member in a direction perpendicular to the imaging surface,
    wherein the thermally deformable member suppresses a change in the first distance due to a change in temperature, by deforming in accordance with temperature.

14. The electronic device according to claim 13, wherein, when seen from a direction perpendicular to the imaging surface, each of points at which an end of the thermally deformable member contacts the top end surface is outside of a movable area of the ball, and an area defined by connecting the points includes the movable area of the ball.

15. The electronic device according to claim 13, wherein the connecting member has on its outer surface a plurality of protruding portions that extend in a direction perpendicular to the imaging surface, and the hole has a plurality of recessing portions that fit with the plurality of protruding portions, respectively.

16. The electronic device according to claim 13, wherein the hole has a plurality of protruding portions that extend in a direction perpendicular to the imaging surface, and the connecting member has on its outer surface a plurality of recessing portions that fit with the plurality of protruding portions, respectively.

17. The electronic device according to claim 13, wherein the connecting member has an abutment portion that abuts against the second supporting member so that a distance between the top end surface of the connecting member and the bottom surface of the hole does not become shorter than a predetermined second distance.

18. The electronic device according to claim 13 further comprising a displacement unit that displaces the second supporting member on a plane parallel to the imaging surface, the displacement unit being provided on the second supporting member and the third supporting member.

19. The electronic device according to claim 13, wherein the thermally deformable member has a through hole centered on a center of gravity of the thermally deformable member, and
   wherein the hole has on its bottom a protruding portion that fits into the through hole.

20. The electronic device according to claim 13, wherein the thermally deformable member has a through hole centered on a center of gravity of the thermally deformable member, and
   wherein the connecting member has on its top end surface a protruding portion that fits into the through hole.

21. The electronic device according to claim 13, wherein the thermally deformable member has a shape in which a portion near its center is raised from its peripheral portion.

22. The electronic device according to claim 13, wherein the thermally deformable member has a shape whose peripheral portion is curved.

23. The electronic device according to claim 13, wherein the thermally deformable member has a flat plate shape.

24. The electronic device according to claim 13, wherein the thermally deformable member is formed by combining a plurality of temperature deformable parts.

25. The electronic device according to claim 13, wherein the thermally deformable member is made of bimetal.

26. The electronic device according to claim 13, wherein the adjusting member is a washer, and
   wherein the image sensor unit is installed to the first supporting member by a screw via the washer.

27. The electronic device according to claim 13, wherein heat transfer grease is filled to a space where the thermally deformable member is provided.

* * * * *